United States Patent
Goudot

(10) Patent No.: US 11,459,532 B2
(45) Date of Patent: Oct. 4, 2022

(54) MALTING PROCESS FOR STEEPING GRAIN COMPRISING A WATER CIRCULATION STEP

(71) Applicant: MALTERIES SOUFFLET, Nogent sur Seine (FR)

(72) Inventor: Philippe Jean-Marie Goudot, Griesheim sur Souffel (FR)

(73) Assignee: MALTERIES SOUFFLET, Nogent sur Seine (FR)

( * ) Notice: Subject to any disclaimer, the term of this patent is extended or adjusted under 35 U.S.C. 154(b) by 408 days.

(21) Appl. No.: 16/805,121

(22) PCT Filed: Aug. 30, 2018

(86) PCT No.: PCT/EP2018/073376
§ 371 (c)(1),
(2) Date: Feb. 28, 2020

(87) PCT Pub. No.: WO2019/048338
PCT Pub. Date: Mar. 14, 2019

(65) Prior Publication Data
US 2021/0189305 A1    Jun. 24, 2021

(30) Foreign Application Priority Data
Sep. 5, 2017    (EP) .................... 17306149

(51) Int. Cl.
*C12C 1/02*    (2006.01)
*C02F 1/74*    (2006.01)
(Continued)

(52) U.S. Cl.
CPC .............. *C12C 1/02* (2013.01); *C02F 1/74* (2013.01); *C02F 1/001* (2013.01); *C02F 1/444* (2013.01);
(Continued)

(58) Field of Classification Search
CPC ................................ C12C 1/02; C02F 1/74
(Continued)

(56) References Cited

U.S. PATENT DOCUMENTS

2005/0170043 A1    8/2005   Harris
2009/0285957 A1*  11/2009   Kishinami ............. A23L 7/152
                                                     426/507

FOREIGN PATENT DOCUMENTS

EA    200400299 A1    8/2004
EA        006024 B1    8/2005
(Continued)

OTHER PUBLICATIONS

International Search Report for International Patent No. PCT/EP2018/073376 dated Sep. 21, 2018.
(Continued)

*Primary Examiner* — Hamid R Badr
(74) *Attorney, Agent, or Firm* — Pearne & Gordon LLP

(57) ABSTRACT

The present invention concerns malting process for steeping grain comprising the provision of at least a first steeping tank having an inlet and an outlet, a second steeping tank having an inlet and an outlet, and a water circulation device fluidly connecting the outlet of the first steeping tank and the inlet of the second steeping tank for circulating steeping water from the first steeping tank in the second steeping tank.

10 Claims, 2 Drawing Sheets

Figure 1:
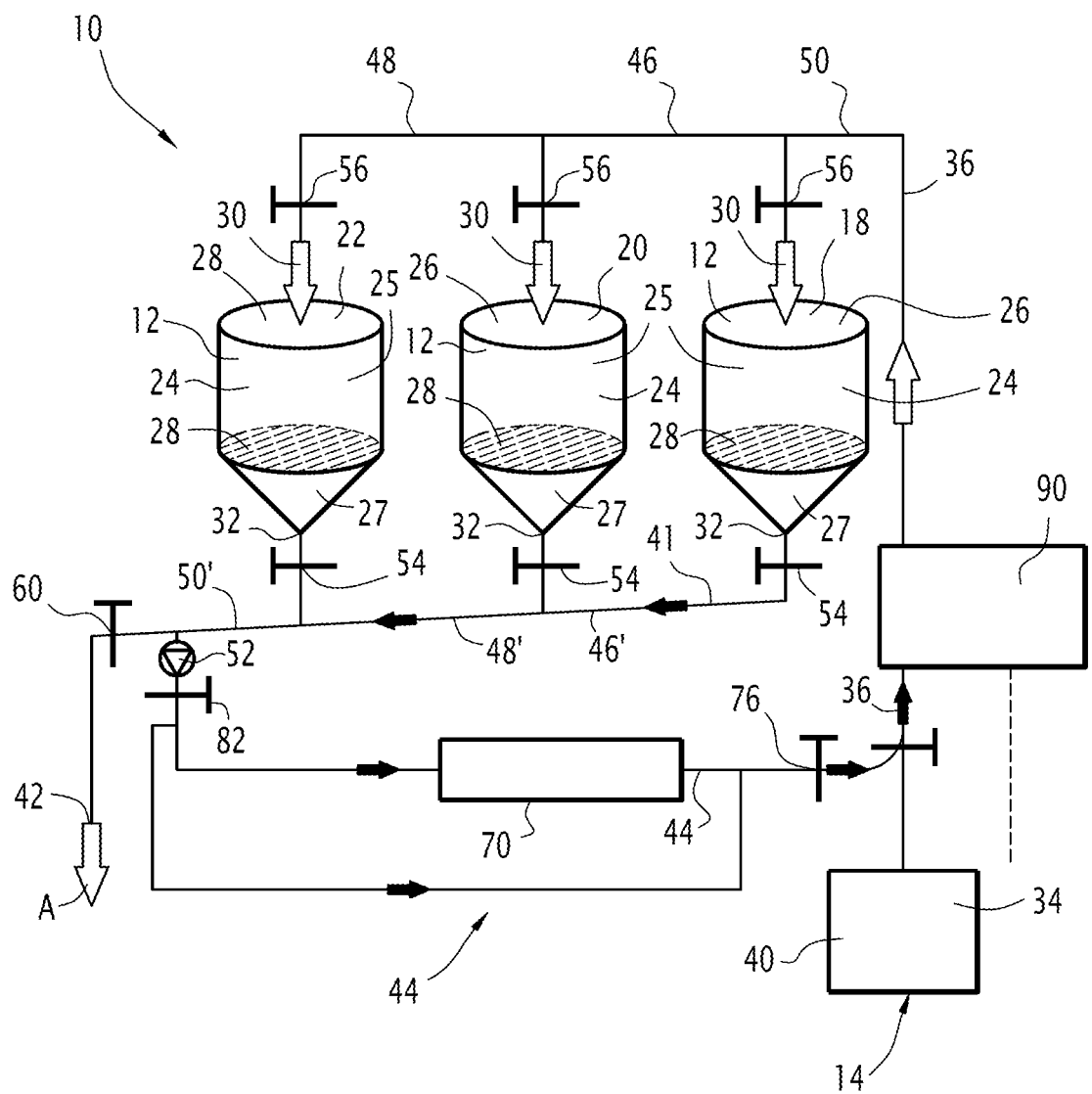

(51) Int. Cl.
*C02F 1/00* (2006.01)
*C02F 1/44* (2006.01)
*C02F 103/32* (2006.01)

(52) U.S. Cl.
CPC .... *C02F 2103/32* (2013.01); *C02F 2201/005* (2013.01); *C02F 2301/046* (2013.01); *C02F 2301/063* (2013.01)

(58) Field of Classification Search
USPC .......................................................... 426/507
See application file for complete search history.

(56) References Cited

FOREIGN PATENT DOCUMENTS

| GB | 2258243 | * | 2/1993 | ............... C12C 1/02 |
| GB | 2258243 | A | 2/1993 | |
| WO | 2008135222 | A1 | 11/2008 | |

OTHER PUBLICATIONS

Extended European Search Report for European Patent No. EP 17306149.0 dated Feb. 2, 2018.
Guiga, et al., "Quantification of the inhibitory effect of steep effluents on barley germination", Process Biochemistry, Elsevier Ltd., GB, vol. 43, No. 3, pp. 311-319, retrieved Dec. 14, 2007.
Gunkel, "Studies on contamination of steeping water with filamentous fungi (Untersuchungen zur Belastung von Weichwasser durch Schimmelpilze)", Brauerei F, Westkreuz Verlag, Berlin, DE, vol. 1, No. 1, pp. 4-6, Jan. 1, 1998.
Kieninger et al., "Trace elements in malts prepared by various malting methods (Einige Spurenelemente in Malzen unterschiedlicer Herstellungsweise)", Brauwissensch, Nuernberg, DE, vol. 32, No. 11, 316-320, Jan. 1, 1979.
Water Iq: "OPTISTEEP", XP055450121, Retreived from the Internet: URL:https://www.yumpu.com/en/document/view/51442255/ optisteepr-the water-iq-website, Feb. 12, 2018.

* cited by examiner

MALTING PROCESS FOR STEEPING GRAIN COMPRISING A WATER CIRCULATION STEP

CROSS-REFERENCE TO RELATED APPLICATIONS

This is a National Stage application of PCT international application PCT/EP2018/073376, filed on Aug. 30, 2018, which claims the priority of European Patent Application No. 17306149.0, Sep. 5, 2017, both of which are incorporated herein by reference in their entirety.

The present invention relates to a malting process for steeping grain.

Malting consists of 3 main phases, soaking or steeping, germination and kilning.

The object of the steeping phase is to raise the moisture of the grain in order to trigger the activation of the enzymes and to cause the natural process of germination.

Steeping is mainly done in two types of tanks: the first type having a conical bottom and the second being flat-bottomed.

The former has the advantage of reduced water consumption and gravity handling but is limited in capacity for technical reasons (tank size) and quality (homogeneity of production, ventilation capacity, etc.). Its capacity is generally limited to 70 tons and is therefore multiplied in order to obtain bigger batch sizes and higher production capacities.

The latter has the advantage of not being limited in capacity. It allows greater ventilation sometimes serving as pre-germinating tank. However, it has the drawback of consuming more water due to its shape (false bottom) and the investment is higher because it requires a radial discharger to be unloaded.

For plants having a high production capacity, it is common to use a combination of both technologies.

The object of steeping is to raise the moisture of the grain in order to trigger its germination and this, without asphyxiating it.

To do this, a succession of 1 to 4 sets, typically 2 or 3 sets of wet steeping separated by periods of dry steeping, also called air rest, is carried out. This process lasts typically from 1 to 2 days.

During wet steeping, the grain is completely submerged under water. Air is regularly blown into the tanks to re-oxygenate the water (oxygen consumed by the grain) and homogenize the tank by stirring the grain. It is therefore important that the grain is completely submerged.

During dry steeping, the water is evacuated leaving the grain without any water between the grains on a perforated grid at the bottom of the tank which will allow extraction of general atmosphere and heat from the grain.

These two phases are repeated from 1 to 3 times depending on the design of the plant, the temperature of the water, the cereals and varieties used and the final characteristics sought.

Water consumption is usually comprised between 1 and 1.3 $m^3$ per ton of steeped barley and per wet steeping, depending on the type of equipment used. Barley moisturization by steeping is the main point of water consumption in malting plant, regarding the two other steps of process consuming water, i.e. germination phase and plant cleaning.

Moreover, the water used for steeping grain must be of food grade. Intermediate storage of water issued from wet steeping causes the development of a microbiological load making water unsuitable for reuse for a second wet steeping.

In plants which operate in discontinuous batch, a single batch of grains is often divided into several steeping tanks in which steeping is implemented in parallel. At the end of this steeping step, the grains of the steeping tanks are gathered in a same germination box or vessel where germination of the whole batch takes place. In such plants, each steeping tank is filled independently with food grade water.

The protection of the planet, the scarcity of water in certain areas and its rising prices are prompting companies to think about alternative solutions in order to guarantee a sustainable development of the activity.

It is well known that recycling steep out water to subsequent steeps results in a delayed germination and a deterioration of malt quality, due to the presence in recycled water of germination inhibitors, of other organic compounds favorable to microorganism growth if the recycled water is stored, of other non-desirable compounds.

EP 1 988 150 describes a malting process wherein steeping is at least partially carried out with recycled steep water. In this process, steeping water from a same tank containing grain from a given batch is recovered at the end of the steeping process, is then treated for removing germination inhibitors and is eventually fed back in the same tank containing new grain from a different batch.

However, in this process, water may be stored for a long period of time before being recycled, and a bioreactor is needed in order to remove germination inhibitors and/or microflora from steep water.

Also known in the art is a malting process using the technology OPTISTEEP®. OPTISTEEP® is a water purification system for treating steeping water during only one single prolonged wet steeping step of the steeping process. In this process, steeping water from a same tank containing grain from a given batch is continuously cleaned by selective adsorption in addition to a filtration membrane and fed back in the same tank during the same single wet steeping step, in order to remove non-desirable compounds having a negative effect on further germination. OPTISTEEP® is then the implementation of a specific and expensive water treatment system. OPTISTEEP® is especially interesting in case of one single wet steeping.

In case of successive wet steeping steps alternating with dry steeping steps, which is the very large common way of performing steeping in existing malting plants, the reduction of water consumption is not covered by OPTISTEEP®.

GB2258243 describes a water recirculating means for delivery of water from below the grain supporting floor to the top of the same tank to substantially reduce the temperature profile of the grain across the steeping tank. Applying this invention to the problem of water saving by reducing the water quantity would lead to not submerge the grain in the steeping tank and by thus, would inevitably lead to create preferentially water flow paths through the grains in the tank, leading to quality heterogeneity of steeped grains, which is contrary to the objective.

Furthermore, European regulation at the date of the invention, imposes maltsters to only introduce food grade water at the beginning of a wet steeping phase of a given batch of grains. In other words, it is forbidden to recycle water used for the wet steeping phase of a given batch of grains to proceed with the wet steeping phase of another batch of grains.

The present invention aims at palliating the drawbacks recited above.

The present inventors have surprisingly found that performing multiple immersion phases of a given batch of grains in different tanks during the same wet steeping phase by implementing water circulation from one tank to another without grain movement allowed reducing water consumption during wet steeping without altering grain quality. In particular, in the present invention, water is not stored between two tanks, and all tanks, which contain grains from a single batch, are in the same wet steeping phase, which means that water is not recycled, contrary to the device of EP 1 988 150, but circulates between two tanks.

For this purpose, the malting process for steeping grain of the invention comprises the following successive steps:

1) Providing a malt house equipment (10, 10') comprising at least:
- a plurality of steeping tanks (18, 20, 22), each steeping tank (18, 20, 22) comprising walls delimiting an internal grain-receiving space (25), each steeping tank (18, 20, 22) comprising an inlet (30) for grain, water and/or air and an outlet (32) for grain, water and/or air, and a grid (28) pierced with orifices configured to evacuate the water from the steeping tank (18, 20, 22) and allow air circulation while maintaining the grains in the internal space (25) of the steeping tank (18, 20, 22),
- optionally a device for feeding water into the internal space of each steeping tank (18, 20, 22),
- optionally a device for extracting general atmosphere and heat from the internal space of each steeping tank,
- optionally a device for feeding air into the internal space of each steeping tank,
- a water circulation device (44) arranged between at least a first steeping tank (18) of the plurality of steeping tanks (18, 20, 22) and a second steeping tank (20) of the plurality of steeping tanks (18, 20, 22), the water circulation device fluidly connecting the outlet (32) of the first steeping tank (18) and the inlet (30) of the at least second steeping tank (20), 2a) filling each steeping tank (18, 20, 22) with a same batch of grains being in a same wet steeping phase, 2b) feeding water into the internal space (25) of the first steeping tank (18) until the grains of the first steeping tank (18) are immersed, while the grains in the internal space of the second steeping tank (20) are not immersed, 2c) optionally feeding air into the internal space (25) of the first steeping tank (18), the grains in the first steeping tank (18) remaining immersed for a predetermined period of time, 2d) evacuating the water through the water outlet (32) of the first steeping tank (18) into the water circulation device (44) while the grains stay in the first steeping tank (18), and 3) feeding said water from the first steeping tank (18) into the second steeping tank (20) through the water circulation device (44) until the grains of the first steeping tank (18) are no longer immersed.

Thus, steeping water from the first steeping tank is also used in the second steeping tank, while the grain remains wet in the first steeping tank and allows continuing the water migration into the grain. Consequently, water is saved. There is no grain transfer between tanks during the whole steeping process, which may include several consecutive immersions during the same wet steeping phase in the same tank. There is also no water storage between two steeping tanks, leading to modification of the composition of the water due to microbial developments. Furthermore, the time of contact of steeping water with the submerged grain is short, so that steeping water is not loaded by germination inhibitors or other organic compounds leached from the grains.

According to preferred embodiments of the invention, the malting process for steeping grain may also comprise the following features, taken alone or in every technically feasible combination:
- the water circulation device comprises at least one circulation pump;
- the malt house equipment further comprises a water aeration device connected to the water circulation device connecting the outlet of the first steeping tank and the inlet of the second steeping tank;
- The malting process further comprising a step 4 wherein steps 2b to 3 are repeated;
- step 3 comprises feeding water into the internal space of the second steeping tank, until the grains in the second steeping tank are immersed while the grains in the internal space of the first steeping tank are not immersed, wherein the main part of said water is water coming from the first steeping tank through the water circulation device, optionally feeding air into the internal space of the second steeping tank, the grains in the second steeping tank remaining immersed for a predetermined period of time, and evacuating the water through the water outlet of the second steeping tank while the grains stay in the second steeping tank;
- the water from a last steeping tank of the plurality of steeping tanks (different from the first steeping tank) is fed back into the first steeping tank of the plurality of steeping tanks through the water circulation device.

Therefore, steeping water issued from the first steeping tank has circulated and is fed back in said first steeping tank.

The invention allows limiting the water consumption while maintaining several immersion phases during wet steeping, while the process using OPTISTEEP® carries out only one single immersion phase corresponding to the wet steeping without dry steeping. The invention thus makes it possible to save steeping water in existing installations without significant investment, whereas OPTISTEEP® requires an expensive water treatment installation.

The period of time between two periods during which the grains are immersed in a same steeping tank is preferably adjusted so that the grains present inside said steeping tank remain wet during that period.

Grain contained in all steeping tanks is thus allowed to remain wet during the entire wet steeping phase.

The malt house equipment may further comprise a device for treating the water coming from the outlet of at least one steeping tank from the plurality of steeping tanks.

The malting process for steeping grain may further comprise a step of treating water from the outlet of the steeping tank with the device for treating water.

The device for treating water allows removing suspended matter from water used through the water circulation device, or any other non-desirable compound.

The malt house equipment may further comprise valves being operable between an open position wherein water is allowed to flow and a closed position preventing water from flowing, said valves being arranged at the outlet of each steeping tank wherein each valve is operated independently.

The valves allow filling selected tank with a desired quantity of water from the water feeding device or from the water circulation device, and bypassing a circuit if desired.

The invention will be better understood upon reading the description which follows, only given as an example and made with reference to the figures.

FIGURES

FIG. 1 schematically illustrates a malt house equipment according to an exemplary embodiment of the invention.

Figure 2:
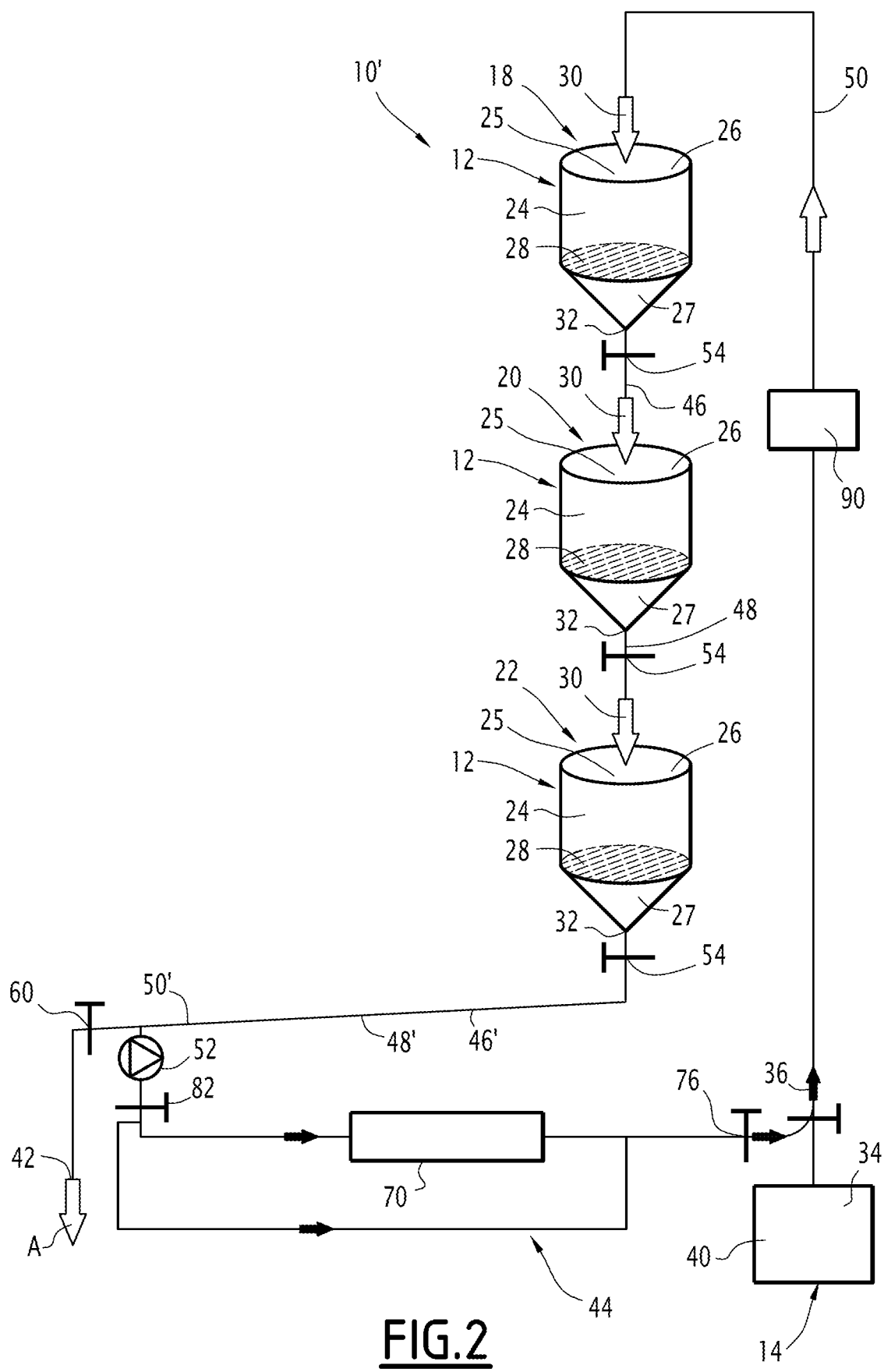

FIG. 2 schematically illustrates a malt house equipment according to another exemplary embodiment of the invention.

DETAILED DESCRIPTION OF THE INVENTION

An embodiment of malt house equipment 10 as used in the context of the present invention is illustrated in FIG. 1.

The malt house equipment 10 comprises at least a plurality of steeping tanks 12 for receiving grain and a device 14 for feeding water for steeping grain.

The terms "steeping tank" and "tank" as intended herein are used interchangeably.

According to the invention, "grain" or "grains" include seeds (kernels) of germinating grains such as cereal grains that can be malted, in particular grains from wheat, barley, sorghum, or oats.

In the present description, "upstream" and "downstream" are defined regarding the water circulation direction represented by arrows in FIG. 1.

On the Example of FIGS. 1 and 2, three steeping tanks 18, 20, 22 are illustrated. Alternatively, the malt house equipment 10 according to the invention may comprise a different number of steeping tanks 18, 20, 22 for example two steeping tanks or at least four steeping tanks.

The three tanks 18, 20, 22 in FIG. 1 are hereafter called first tank 18, second tank 20 and third tank 22 in order to distinguish them. These denominations are only intended to clarify the description.

Each tank 18, 20, 22 comprises a body 24. Typically, the body 24 is symmetrical with revolution. The body 24 is for example of cylindrical overall exterior shape with a conical bottom or with a flat bottom.

In the case of a tank with a flat bottom, the tank may comprise a radial discharger intended to evacuate grain.

The malt house equipment 10 may comprise only tanks with a conical bottom.

Alternatively, the malt house equipment 10 may comprise only flat-bottomed tanks.

Alternatively also, the malt house equipment 10 may comprise tanks with a body of conical overall exterior shape and flat-bottomed tanks.

The body 24 of each tank 18, 20, 22 delimitates an internal grain-receiving space 25, hereafter called internal space 25.

The internal space of each tank 18, 20, 22 has typically a capacity smaller or equal to 70 tons smaller or equal to 100 tons, smaller or equal to 600 tons. Preferably, the internal space 25 of each tank 18, 20, 22 has a capacity smaller or equal to 100 tons.

Each tank 18, 20, 22 comprises an opened upper end 26 and a lower end 27 with a bottom.

Each steeping tank 18, 20, 22 comprises a grid 28 pierced with orifices. The grid 28 is typically arranged in the internal space 25 of the steeping tank, close to the lower end 27 of the steeping tank. The orifices may be oblong, round, rectangular or of any adapted shape.

Each orifice has typically a diameter smaller than the grains size, in order to evacuate the water from the steeping tank and allow air circulation while maintaining the grain in the internal space 25 of the steeping tank.

For example, an oblong orifice has a length comprised between 10 mm and 20 mm, and a width comprised between 1 mm and 2 mm, typically 1.8 mm.

This feature also allows performing dry steeping in the same tank at the end of wet steeping.

Each tank 18, 20, 22 comprises at least one grain inlet, at least one water inlet and/or at least one air inlet In one embodiment of the invention as illustrated in FIG. 1, the at least one grain inlet and the at least one water inlet may be only one inlet 30.

Alternatively, the at least one grain inlet, the at least one water inlet and the at least one air inlet may be separated.

Each tank 18, 20, 22 further comprises at least one grain outlet, at least one water outlet and/or at least one air outlet.

In one embodiment of the invention as illustrated in FIG. 1, the at least one grain outlet, the at least one water outlet and the at least one air outlet may be only one outlet 32.

Alternatively, the at least one grain outlet, the at least one water outlet and the at least one air outlet may also be different outlets.

However, there are no limitations on the number of the inlets and the outlets.

In the example shown in FIG. 1, the water inlet is provided at the upper end of the steeping tank 18, 20, 22. The water outlet is provided at the lower end of each tank 18, 20, 22. The grain inlet is provided at the upper end of the steeping tank 18, 20, 22. The grain outlet is provided at the lower end of each tank 18, 20, 22. Typically, in a tank with flat bottom, the air is injected under the tank. In a tank having a conical bottom, air is typically injected into the tank at various levels.

However, there are no limitations on the positioning of the inlets and the outlets.

For example, the water inlet or the air inlet may be provided in the steeping tank 18, 20, 22.

Each tank 18, 20, 22 is typically made of stainless steel, or coated steel, or concrete, or of any adapted material.

The device 14 for feeding water for steeping grain comprises a water supply 34 containing water 40 used for steeping grain.

Water used for steeping grain is generally drinking water, in order to fulfill malt quality requirements. The water feeding device typically comprises a circulation line 36 that supplies drinking water from the water supply 34 to the water inlet 30 of each tank 18, 20, 22.

Alternatively, the water feeding device 14 may comprise a circulation line that supplies drinking water from the water supply 34 to the water inlet of at least one tank.

The malt house equipment 10 may comprise a device for feeding air (not shown) for aerating grain.

The device for feeding air for aerating grain typically comprises an air compressor. The device for feeding air is typically operable between a working position and a resting position as desired during the process.

The malt house equipment 10 may further comprise a device for extracting general atmosphere and evacuating heat from each tank (not shown).

By "general atmosphere" is intended herein carbon dioxide and other gases issued from the grain.

The device for extracting general atmosphere and heat from the internal space of each steeping tank is connected to the air outlet of each tank 18, 20, 22.

The device for extracting general atmosphere and heat provides a better grain aeration and optimal temperature. It can be any device conventionally used in malt house equipment for extracting general atmosphere and heat.

The malt house equipment 10 may further comprise any of the usual equipment of a malt house.

Preferably, the malt house equipment 10 further comprises a conduit 42 for external discharge of waste water arranged downstream the water outlets 32 of each tank 18, 20, 22 (arrow A in FIG. 1).

According to the invention, the malt house equipment 10 further comprises a water circulation device 44 fluidly connecting the steeping tanks 18, 20, 22 together.

Said water coming from the outlet of tanks is thereafter called steeping water.

In the Example in FIG. 1, the water circulation device 44 typically comprises a first circulation line 46, 46' that supplies the steeping water 41 from the first steeping tank 18 to the second steeping tank 20. The first circulation line 46, 46' is typically arranged downstream 46' the water outlet 32 of the first tank 18 and upstream 46 the water inlet 30 of the second tank 20.

The water circulation device 44 typically comprises a second circulation line 48, 48' that supplies the steeping water 41 from the second steeping tank 20 to the third steeping tank 22. The second circulation line 48, 48' is typically arranged downstream 48' the water outlet 32 of the second tank 18 and upstream 48 the water inlet 30 of the third tank 20.

The water circulation device 44 typically comprises a third circulation line 50, 50' that supplies the steeping water 41 from the third steeping tank 22 to the first steeping tank 18. The third circulation line 50, 50' is typically arranged downstream 50' the water outlet 32 of the third tank 22 and upstream 50 the water inlet 30 of the first tank 18.

Of course, when the number of tanks is different, the water circulation device may comprise circulation lines between each tank.

In an alternative embodiment, when the number of tanks is an even number, the water circulation device may comprise circulation lines connecting the water inlets and the water outlets of the tanks two by two.

Typically, the water circulation device 44 comprises at least one circulation pump 52. The circulation pump 52 allows water to flow from the water outlet 32 of the tanks 18, 20, 22 to the water inlet 30 of the tanks 18, 20, 22. As commonly known, the circulation pump 52 may be accompanied by a cylinder so that the circulation pump 52 does not run empty. Such a cylinder is not aimed at storing water during operation of the malt house equipment 10.

The circulation lines 46, 48, 50 are common and at least partly fluidly connected to the water feeding device 14 and to the conduit 42 for external discharge of waste water. Typically, the water circulation device 44 comprises at least one valve 82 arranged downstream of the water outlets 32 of the tanks 18, 20, 22 on the circulation line 46', 48', 50' in order to bypass the circulation device 44 if necessary.

The water circulation device 44 may further comprise at least one valve 76 arranged upstream of the water inlets 30 of the tanks 18, 20, 22.

Preferably, the malt house equipment 10 according to the invention is devoid of a device for storing steeping water between two tanks. Indeed, the device according to the invention is suitable for circulating steeping water between tanks of the same batch in the same steeping phase and not for recycling water between batches.

To this end, for each tank 18, 20, 22 at least one valve 54 is arranged at the water outlet 32.

In the Example of FIG. 1, one valve 56 is also arranged at the water inlet 30 of each tank 18, 20, 22 in order to select the tank to be filled with water from the water circulation device 44 or from the device for feeding water 14.

In the present description, each valve 54, 56 is operable between an open position wherein water is able to flow and a closed position wherein water is prevented from flowing.

Preferably, each valve 54, 56, 76, 82 is independently operable. Preferably also, the operation of each valve 54, 56 is automated.

A valve 60 is typically arranged upstream the conduit 42 for external discharge of waste water.

In the example of FIG. 2, the three tanks 18, 20, 22 of the malt house equipment 10' are arranged vertically.

A valve 54 is arranged at the water outlet 32 of each tank 18, 20, 22. Water is thus able to flow by gravity from one tank to the next tank through the water circulation device 44. The device for feeding water 14 may be fluidly connected to each tank 18, 20, 22 separately. Alternatively, the device for feeding water 14 is fluidly connected to at least one tank 18, 20, 22.

The circulation pump 52 allows water flowing from the lower tank 22 to the higher tank 18.

In a specific embodiment of the invention, the malt house equipment 10 comprises a device 70 for treating the steeping water 41 coming from the outlet 32 of at least one steeping tank 18, 20, 22 before reintroducing water into the next steeping tank. The device 70 for treating the steeping water 41 aims at retaining suspended matter.

For example, the device for treating water 70 comprises a filtration system such as a filtration membrane arranged inside the circulation line, transversally to the water flow, or an ultrafiltration membrane, or a rotating screen, or a sand filter, or a cartridge filter.

Alternatively, the device for treating water 70 may comprise any device suitable for treating water.

In this specific embodiment, the device for treating water 70 comprises typically at least one valve arranged upstream of the device for treating water 70, and at least one valve arranged downstream of the device for treating water 70 in order to bypass the device for treating water 70 if desired.

Preferably, the malt house equipment 10 comprises a water aeration device 90 connected to the water circulation device 44 connecting the outlet 32 of the first steeping tank 18 and the inlet 30 of the second steeping tank 20.

Preferably, the water aeration device 90 is arranged downstream the device for treating water 70. Thus, steeping water is aerated after being treated.

The water aeration device 90 allows reoxygenating steeping water 41 during water circulation.

For example, the device 90 for aerating steeping water is a suction system by Venturi effect connected upstream to the circulation line 46, 48, 50.

A malting process for steeping grain according to the invention will now be described.

A typical malting process for steeping grain comprises two major distinct operations, wet steeping and dry steeping as defined above, each operation being performed once or several times in each tank.

In the context of the present invention, only the wet steeping phase will be detailed.

At the beginning of the process according to the invention, each steeping tank 18, 20, 22 is loaded with grain. To this purpose, a prescribed amount of grains is loaded into the internal space of the steeping tank 18, 20, 22. Preferably, said grains belong to a same batch. By "batch" is intended herein grains belonging to a same production lot, which are intended to undergo the same wet steeping phase in parallel in multiple steeping tanks.

Consequently, the same batch of grains is used to produce a single malt lot.

Next, at least one tank 18 is loaded with a prescribed amount of water until the grains of the first steeping tank 18 are immersed, while the grains in the internal space of the second steeping tank 20 are not immersed.

The process is preferably adapted so that each immersion phase has a sufficient duration in each tank for the same batch, that is to say so that the grains do not have the time to dry completely between two consecutive immersion phases.

In FIGS. 1 and 2, water flows according to the arrows.

Wet steeping is thereafter detailed for one tank 18, called the first tank 18. Wet steeping is intended to be similar in each tank.

The amount of grain and water in the first tank 18 may be appropriately adjusted depending on the type of steeping tank 18 used, so that all of the steeping grains are immersed in water to allow uniform addition of moisture to the grains and prevent the formation of preferential water flow paths through the grains.

As will be understood by the skilled person, the amount of water used will depend on the type of grain used (mainly specific weight and shape) and on the shape of the tank.

Typically, between one cubical meter and two cubical meters of water are used per ton of grain. Preferably, between one cubical meter and 1.3 cubical meters of water are used per ton of grain. Typically, in a flat-bottomed tank, 1 cubical meter of water is used per ton of grain, in addition to the water volume comprised between the grid and the bottom of the tank.

Air is typically fed from the device for feeding air through the air inlet of the first tank 18 into the internal space 25 of the steeping tank 18 during wet steeping.

A heater and cooler can typically be operated based on the temperature set by a temperature controller to feed water 40 in the steeping tank 18 at the prescribed temperature. The temperature of the water 40 is preferably comprised between 12° C. and 20° C.

The grain in the first tank 18 is immersed for a prescribed duration. For example, grain immersion typically lasts between 15 minutes and 60 minutes.

At the end of the prescribed duration, steeping water 41 from the internal space 25 of the first tank 18 is evacuated through the water outlet 32 of the first steeping tank 18, while the grains stay in the first steeping tank 18.

Water circulates from the first tank 18 to the second tank 20 through the water circulation device 44, and grain stays on the grid 28 pierced with orifices in the internal space 25 of the first tank 18.

General atmosphere and heat may be extracted through the air outlet 32 of the first steeping tank 18 after all the water has been extracted and the grains have drained sufficiently.

During a water circulation step, steeping water 41 from the first tank 18 is then supplied to the second tank 20 by the water circulation device 44 until the grains of the first steeping tank 18 are no longer immersed. Typically, steeping water 41 is supplied by the first circulation line 46. In the Example as illustrated in FIG. 1, the valve 54 arranged at the water outlet 32 of the first tank 18 and the valve 56 arranged at the water inlet 30 of the second tank 20 are opened. The valve 82 arranged downstream of the water outlets 32 of the tanks 18, 20, 22 on the circulation line 46', 48', 50' and the valve 76 arranged upstream of the water inlets 30 of the tanks 18, 20, 22 are opened. In this Example, the valves arranged at the water inlet 30 of the first tank 18, at the water outlet 32 of the second tank 20, and at the water inlet 30 and the water outlet 32 of the third tank 22 are closed.

The amount of water in the second tank 20 may be appropriately adjusted with water 40 from the water supply 34 so that all of the steeping grains is immersed in water in the second steeping tank 20 to allow uniform addition of moisture to the grain.

At the end of the water circulation step transfer, the water discharging valve 56 at the water inlet 30 of the second tank 20 is closed.

The time between the beginning of the water circulation step from the first steeping tank 18 to the second steeping tank 20 and the end of said water circulation step is typically comprised between 15 minutes and 60 minutes, depending upon the capacities of the tank and of the water circulation device.

Grain immersion is then performed in the second tank 20 for a prescribed duration.

During this step, the grains inside the first tank 18, while not being immersed, remain wet.

Both tanks 18, 20 are thus in the same wet steeping phase.

At the end of the prescribed duration, the same process as described above is then repeated between the second tank 20 and the third tank 22, between the third tank 22 and the first tank 18, between the first tank 18 and the second tank 20, and so on, for a predetermined duration. The tank of which steeping water is fed back into the first steeping tank 18 is then called "the last tank".

The period of time between two periods during which the grain is immersed in a same tank is adjusted so that the grains present inside said tank remain wet during that period.

The moisture of the grains can be determined by any technique well-known from the skilled person, for example by visual observation of the appearance of the grains.

Thus, the grains stay wet during the entire wet steeping phase, which may include several consecutive immersed phases. By "wet" is intended herein that there are at least water menisci between the grains and a film of water on the grains.

Preferably, the method further comprises a step of treating water by the device for treating water 70. In this embodiment, after each stay in a steeping tank 18, 20, 22, steeping water 41 flows through the device for treating water 70 before being fed to the next steeping tank. Thus, suspended matters or any other non-desirable compounds are removed from steeping water 41 and the efficiency of wet steeping is improved.

Upon completion of the wet steeping phase, the steeping water 41 in the steeping tank 18, 20, 22 is discharged.

Further, air feeding is stopped.

Preferably, general atmosphere and heat are extracted through the air outlet 32 of each steeping tank 18, 20, 22. Grain enters the dry steeping phase as described above without moving from one tank to another and before entering in a new wet steeping phase as the case may be.

The batch of grains obtained by this steeping process may be removed through the grain outlet 32 of each steeping tank 18, 20, 22 and then supplied to a germinating step.

In another embodiment of the invention, the malt house equipment 10 is similar to the one illustrated in FIG. 1 but comprises at least four tanks consisting of at least two first tanks and at least two second tanks. The number of tanks is preferably an even number. According to this embodiment, at least two first tanks are in a wet steeping at the same time and for a prescribed duration. At the end of the prescribed duration, steeping water is evacuated from the first tanks and is fed into the second tanks through the water circulation device.

Thanks to the above described features, water consumption is reduced during grain steeping. Moreover, the water consumption reduction is allowed without affecting or slowing down the process of germination of the grain, without bringing a load of contaminants and without altering the quality of the beer produced from the obtained malt.

The invention may be implemented in various modes, without being limited to the embodiment described above.

EXAMPLES

Material and Methods
First Trial

4 Tanks A1, A2, B1, B2 are provided and configured according to the Example of FIG. 1.

The tanks are loaded with grain, herein barley of the variety Nectaria. 99,932 kg of grain are distributed equally in each tank, that is to say about 25 t grain/tank. Each tank has a maximal capacity of 30 tons.

Drinking water is fed inside the tank A1 till grains are immersed. The temperature of water coming to A1 is typically 19° C.

The trial begins.

The grain inside A1 is immersed during 10 minutes.

The steeping water from A1 is then transferred to A2 through the water circulation device. Water is completed in A2 until all the grain is immersed. The transfer lasts approximately 15 minutes.

The grain inside A2 is immersed during 10 minutes.

The steeping water from A2 is then transferred to B1 through the water circulation device. Water is completed in B1 until all the grain is immersed. The transfer lasts approximately 15 minutes.

The grain inside B1 is immersed during 10 minutes.

The steeping water from B1 is then transferred to B2 through the water circulation device. Water is completed in B2 until all the grain is immersed. The transfer lasts approximately 15 minutes.

The grain inside B2 is immersed during 10 minutes.

The steeping water from B2 is then transferred back to A1 through the water circulation device. Approximately one hour and 40 minutes have elapsed since the beginning of the trial. Water is completed in A1 until all the grain is immersed. The transfer lasts approximately 15 minutes.

The grain inside A1 is immersed during 10 minutes.

The same process continues such that the grain inside each tank is immersed four times.

General atmosphere may be extracted discontinuously from each tank for 10 minutes to one hour during phases when grain is not totally immersed.

Steeping water is then evacuated from tank B2, six hours and 40 minutes after the beginning of the trial.

Dry steeping starts.

Barley samples BS1 and BS2 are taken in tanks A1 and B2 in order to control barley moisture and quality 10 hours after the beginning of the trial, and to control the absence of heterogeneity between first and last tanks due to the new process.

Second Trial

4 Tanks A1, A2, B1, B2 are provided and configured according to the Example of FIG. 1.

The tanks are loaded with grain, herein barley of the variety Nectaria. 99,938 kg of grain are distributed equally in each tank, that is to say about 25 t grain/tank. Each tank has a maximal capacity of 30 tons.

Drinking water is fed inside tanks A1 and A2 till grains are immersed in both tanks. The temperature of water coming to A1 and A2 is typically 19° C., The trial begins.

The grain inside A1 and A2 is immersed during 20 minutes.

The steeping water from A1 and A2 is then transferred to B1 and B2 through the water circulation device. Water is completed in B1 and B2 until all the grain is immersed. The transfer lasts approximately 20 minutes.

The grain inside B1 and B2 is immersed during 20 minutes.

The steeping water from B1 and B2 is then transferred back to A1 and A2 through the water circulation device.

Approximately one hour and 20 minutes have elapsed since the beginning of the trial. Water is completed in A1 and A2 until all the grain is immersed. The transfer lasts approximately 20 minutes.

The grain inside A1 and A2 is immersed during 20 minutes.

The same process continues such that the grain inside each tank is immersed five times.

Steeping water is then evacuated from tanks B1 and B2, six hours and 20 minutes after the beginning of the trial.

Then, dry steeping starts for 12 hours, followed by a second wet steeping phase for 6 hours. The second wet steeping phase is standard.

During dry steeping, general atmosphere is extracted discontinuously from each tank for 10 minutes phases and stopped for 20 minutes phases.

Barley samples BS3 and BS4 are taken in tanks A1 and B2 in order to control barley moisture and quality 10 hours after the beginning of the trial and to control the absence of heterogeneity between first and last tanks due to the new process.

Control

The standard batches were produced with a steeping program of 8.5 hours wet steep—12 hours dry and 6 hours wet steep, with the same lot of barley at same temperatures of water.

The malt produced from the two trials is then analyzed to determine the moisture, the water consumption during the trials and the yield of malt produced (Tab. 1), in comparison of two malts produced with the same barley variety in standard batches.

Results

Moisture 10 Hours after the Beginning of the Trials

Moisture is measured by infrared drying, typically at 105° C. until the grain has a stable weight.

BS1 32.2% (1rst trial)
BS2 31.8% (1rst trial)
BS3 34.2% (2d trial)
BS4 33.2% (2d trial)

These differences in humidity are not significant. The system therefore allows a homogeneous steeping between the tanks, whether the four tanks are arranged in series or by pair of two tanks in series.

Moisture of the Malt Produced

Moisture is measured according to European Brewery Convention (EBC) section Malt 4.2, by sampling the entire batch.

First trial: 4.38%
Second trial: 4.44%
Control: 4.77% and 4.67%

Water Consumption

The volume is calculated according value read on a water flowcounter.

The facility uses wet transfer to move grain from steeping to germinating box, which consumes water in addition to that of steeping itself.

First trial: 252 cubical meters, that is to say 2.52 m³/t grains

Second trial: 270 cubical meters, that is to say 2.70 m³/t grains

Control: 335 cubical meters and 384 cubical meters, that is to say 3.35 m³/t grains, and 3.8 m3/t grains depending on the location of the germination box vs the location of the steeping room (wet transfer).

Yield of Malt

Yield=malt produced (kg)/steeped barley (kg)

First trial: 85.8%
Second trial: 84.8%
Control: 85.8% and 86.1%.

Quality of Malt

Standards quality tests according to EBC section Malt were conducted on malt produced in first and second trials vs on control malts. The results are shown in Table 1. The results do not show any significant difference between them.

Gushing tests were also carried on malt with internal method: 350 mL distilled water is used for extraction of 100 g of malt during 1 mn in a blender at higher speed, and after centrifugation 10 mn at 5000 rpm, the supernatant is boiled during time necessary to obtain 200 mL. After cooling at ambient temperature and filtration on paper filter, 50 mL of the filtrate are added to a bottle of beer Heineken of 33 cL of which 50 mL of beer are previously discard. Each bottle is then encapsulated and pasteurized at 60° C. After cooling, the bottle is weighted and then horizontally shacked during 3 days at 20° C. at 60 shakes/mn. After 10 mn of rest, the bottle is manually vertically shacked 3 times in 10 s, and after a new rest of 30 s, the bottle is opened and if some beer gushed the bottle is weighed after gushing. The malt is deemed not gushing if the weight loss is under 50 g. Gushing test is made on 3 bottles and repeated twice.

Gushing tests of trials beers are reported in Tab. 2 and are negative.

Test of Brewing and Fermentation

Brewing was performed in a microbrewery of 40 L following ISO/MPFE/002. A wort of 12.5° Plato is produced from each malt, issued from trials and control. During brewing phase, 3 steps of respectively 20 mn, 15 mn and 20 mn are followed at respectively 50° C., 64° C. and 74° C. After cooling of wort, 1.5 g dry yeast/L of wort is added to the wort. The yeast is S23 (Saflager). The fermentation occurs during 9 days at 12° C. Cold guard of beer lasts 5 days at −1° C., after what the beer is filtrated on membrane and bottled before analyses.

Test Beer Quality

Beer samples are tasted by an expert panel and noted. The evaluation scale starts at value 1 for undrinkable beer to 9 for perfect beer. Scores over 5 are deemed acceptable beer.

Results of beer quality are reported in Tab. 2. Beer produced by the invention are scored acceptable beers and no significant differences are noted between trials beers and control beers.

Thus, the device according to the invention allows reducing water consumption during steeping without altering grain quality.

TABLE 1

| | Quality of malt | | | | | | | |
|---|---|---|---|---|---|---|---|---|
| | Moisture (%) | Extract dry (%) | Extract Differe (%) | Saccharification (mn) | Color EBC | Total Protein (%) | Soluble Protein (%) | Hartong (%) |
| FIRST TRIAL | 4.4 | 80.7 | 1.7 | 10-15 | 4.3 | 10.4 | 4.3 | 34.9 |
| SECOND TRIAL | 4.3 | 80.2 | 1.5 | 10-15 | 4 | 10.8 | 4.2 | 33.4 |
| Same barley as in TRIALS—previous batches | 4.8 | 80.7 | 1.7 | 10-15 | 4 | 10.6 | 4.3 | 35.5 |
| | 4.7 | 80.4 | 1.1 | 10-15 | 3.9 | 10.7 | 4.4 | 36.5 |

| | Standard analyses | | | | | | | | |
|---|---|---|---|---|---|---|---|---|---|
| | Viscosity (min−1) | pH | Friability (%) | Whole Unmodified (%) | Partly Unmodified (%) | DON µg/Kg (ppb) | NIV µg/Kg (ppb) | OTA µg/Kg (ppb) | T2-HT2 µg/Kg (Nob) | pDMS (mg/Kg) |
| FIRST TRIAL | 1.61 | 6.15 | 85 | 1.6 | 3.2 | Non detected | Non detected | Non detected | Non detected | 3.6 |
| SECOND TRIAL | 1.61 | 6.18 | 83.6 | 1 | 3 | Non detected | Non detected | Non detected | Non detected | 3.7 |
| Same barley as in TRIALS—previous batches | 1.58 | 6.17 | 84.8 | 0.5 | 2.2 | Non detected | Non detected | Non detected | Non detected | 2.8 |
| | 1.59 | 6.19 | 86.6 | 1 | 2.7 | | | | | |

TABLE 1-continued

| | Quality of malt | | | | | | |
|---|---|---|---|---|---|---|---|
| | Other analyses | | | Malt produced | | Wort | |
| | Broken grains (&) | Admixtures (%) | FAN (free amino nitrogen) | Weight (Kg) | Yield (R2) % | Wort filtration (mn) | Brewing yield (%) |
| FIRST TRIAL | 0.9 | 1.3 | 154 | 85774 | 0.858 | 88 | 66.8 |
| SECOND TRIAL | 1.3 | 1.9 | 151 | 84729 | 0.848 | 92 | 66.1 |
| Same barley as in TRIALS— previous batches | 1.7 1.8 | 1.7 1.5 | 154 154 | 85777 86045 | 0.858 0.861 | 100 | 62.9 |

TABLE 2

| | Quality of beer | | | | | | |
|---|---|---|---|---|---|---|---|
| | Real extract (°Plato) | Alcohol (%) | Color (EBC) | Foam stability (s) | Diacetyl (mg/L) | Taste notation | Gushing test (g) |
| FIRST TRIAL | 4.64 | 4.64 | 7.5 | 243 | 0.37 | 6.11 | 0-0 |
| SECOND TRIAL | 5.02 | 4.61 | 6.6 | 248 | 0.42 | 5.78 | 0-6.4 |
| Same barley as in TRIALS— previous batches | 4.76 | 4.61 | 7.8 | 247 | 0.35 | 5.89 | |

What is claimed is:

1. A malting process for steeping grain, the process comprising the following successive steps:
   1) providing a malt house equipment comprising at least:
      a plurality of steeping tanks, each steeping tank comprising walls delimiting an internal grain-receiving space, each steeping tank comprising an inlet for grain, water and/or air and an outlet for grain, water and/or air, and a grid pierced with orifices configured to evacuate the water from the steeping tank and allow air circulation while maintaining the grains in the internal space of the steeping tank,
      a water circulation device arranged between at least a first steeping tank of the plurality of steeping tanks and a second steeping tank of the plurality of steeping tanks, the water circulation device fluidly connecting the outlet of the first steeping tank and the inlet of the at least second steeping tank,
   2a) filling each steeping tank with a same batch of grains being in a same wet steeping phase,
   2b) feeding water into the internal space of the first steeping tank until the grains of the first steeping tank are immersed, while the grains in the internal space of the second steeping tank are not immersed,
   2c) evacuating the water through the water outlet of the first steeping tank into the water circulation device while the grains stay in the first steeping tank, and
   3) feeding said water from the first steeping tank into the second steeping tank through the water circulation device until the grains of the first steeping tank are no longer immersed.

2. A malting process according to claim 1, wherein the water circulation device comprises at least one circulation pump.

3. A malting process according to claim 1, wherein the malt house equipment further comprises a water aeration device connected to the water circulation device connecting the outlet of the first steeping tank and the inlet of the second steeping tank.

4. A malting process according to claim 1, further comprising a step 4 wherein steps 2b to 3 are repeated.

5. A malting process according to claim 1, wherein step 3 comprises the following steps:
   3a) feeding water into the internal space of the second steeping tank, until the grains in the second steeping tank are immersed while the grains in the internal space of the first steeping tank are not immersed, wherein the main part of said water is water coming from the first steeping tank through the water circulation device, and
   3b) evacuating the water through the water outlet of the second steeping tank while the grains stay in the second steeping tank.

6. A malting process according to claim 1, further comprising a step wherein the water from a last steeping tank of the plurality of steeping tanks different from the first steeping tank is fed back into the first steeping tank of the plurality of steeping tanks through the water circulation device.

7. A malting process according to claim 1, wherein the period of time between two periods during which the grains are immersed in a same steeping tank is adjusted so that the grains present inside said steeping tank remain wet during that period.

8. A malting process according to claim 1, wherein the malt house equipment further comprises a device for treating the water coming from the outlet of at least one steeping tank from the plurality of steeping tanks.

9. A malting process according to claim 1, further comprising a step of treating water from the outlet of the steeping tank with the device for treating water.

10. A malting process according to claim 1, wherein the malt house equipment further comprises valves being operable between an open position wherein water is allowed to flow and a closed position preventing water from flowing, said valves being arranged at the outlet of each steeping tank, wherein each valve is operated independently.

* * * * *